US009218261B2

(12) United States Patent
Holden

(10) Patent No.: US 9,218,261 B2
(45) Date of Patent: Dec. 22, 2015

(54) TEST CASE EXECUTION

(71) Applicant: Bank of America Corporation, Charlotte, NC (US)

(72) Inventor: Jay Holden, Tega Cay, SC (US)

(73) Assignee: Bank of America Corporation, Charlotte, NC (US)

( * ) Notice: Subject to any disclaimer, the term of this patent is extended or adjusted under 35 U.S.C. 154(b) by 163 days.

(21) Appl. No.: 14/030,516

(22) Filed: Sep. 18, 2013

(65) Prior Publication Data
US 2015/0082090 A1  Mar. 19, 2015

(51) Int. Cl.
G06F 11/00 (2006.01)
G06F 11/22 (2006.01)

(52) U.S. Cl.
CPC ................................. G06F 11/2294 (2013.01)

(58) Field of Classification Search
CPC .................................................. G06F 11/2294
See application file for complete search history.

(56) References Cited

U.S. PATENT DOCUMENTS

| 6,163,805 | A  | * | 12/2000 | Silva et al. ..................... 709/227 |
| 6,425,096 | B1 | * | 7/2002  | Liese et al. ....................... 714/43 |
| 7,117,484 | B2 | * | 10/2006 | Hartman et al. ............. 717/126 |
| 7,287,190 | B2 | * | 10/2007 | Rosenman et al. ............. 714/32 |
| 7,370,101 | B1 | * | 5/2008  | Lakkapragada et al. ...... 709/223 |
| 7,496,815 | B2 |   | 2/2009  | Bhaumik et al. |
| 7,823,138 | B2 |   | 10/2010 | Arguelles et al. |
| 7,849,438 | B1 |   | 12/2010 | Hemmat et al. |
| 7,895,565 | B1 |   | 2/2011  | Hudgons et al. |
| 8,020,044 | B2 |   | 9/2011  | Martinov |
| 8,239,835 | B2 |   | 8/2012  | Rex et al. |
| 8,275,586 | B2 |   | 9/2012  | Birch et al. |
| 8,301,413 | B2 |   | 10/2012 | Napolin et al. |
| 8,434,058 | B1 |   | 4/2013  | Hudgons et al. |
| 8,862,950 | B1 | * | 10/2014 | Ginsberg et al. ................ 714/57 |
| 2002/0104042 | A1 | * | 8/2002 | Wong et al. ..................... 714/38 |
| 2003/0023900 | A1 | * | 1/2003 | Smith et al. ..................... 714/25 |
| 2003/0028826 | A1 | * | 2/2003 | Balluff ............................. 714/44 |
| 2005/0102580 | A1 | * | 5/2005 | House et al. .................... 714/38 |

(Continued)

OTHER PUBLICATIONS

CA Technologies: Service Virtualization, LISA Service Virtualization for Application Development & Testing, downloaded from <http://www.itko.com/solutions/endtoend_testing/jsp.com> on Sep. 18, 2013.

(Continued)

*Primary Examiner* — Joshua P Lottich
(74) *Attorney, Agent, or Firm* — Banner & Witcoff, Ltd.; Michael A. Springs

(57) ABSTRACT

Systems, methods, computer readable media and apparatuses for executing one or more test cases associated with verifying a functionality of a computer system, software application, or the like are presented. The test cases may be received by a system and may be prioritized and integrated into an existing queue of test cases based on the determined priority. In some examples, a configuration for a computing device to execute the test cases may be identified and transmitted to one or more computing devices available to or scheduled to execute the test cases. Accordingly, the test cases may be dynamically allocated to available computing devices for execution. In some arrangements, one or more reports may be generated and/or transmitted reporting the results of the execution of the test cases. The reports may be accessible via the system and/or may be transmitted to a user via, for example, an email message.

19 Claims, 6 Drawing Sheets

(56) References Cited

U.S. PATENT DOCUMENTS

| | | | |
|---|---|---|---|
| 2005/0188262 A1* | 8/2005 | Rosenman et al. | 714/25 |
| 2005/0228644 A1 | 10/2005 | Wang | |
| 2006/0048005 A1* | 3/2006 | Gollub et al. | 714/25 |
| 2007/0277154 A1 | 11/2007 | Badwe | |
| 2008/0072050 A1* | 3/2008 | Klonover et al. | 713/176 |
| 2008/0120521 A1* | 5/2008 | Poisson et al. | 714/26 |
| 2008/0256389 A1* | 10/2008 | Neethiraj et al. | 714/27 |
| 2009/0138856 A1* | 5/2009 | Oja et al. | 717/126 |
| 2009/0307763 A1* | 12/2009 | Rawlins et al. | 726/5 |
| 2012/0150820 A1 | 6/2012 | Sankaranarayanan et al. | |
| 2013/0007522 A1 | 1/2013 | Kurapati et al. | |
| 2013/0042151 A1 | 2/2013 | McCoy et al. | |
| 2014/0181793 A1* | 6/2014 | Kaliappan | 717/124 |
| 2015/0051863 A1* | 2/2015 | Tsuchida et al. | 702/123 |
| 2015/0066417 A1* | 3/2015 | Kimura et al. | 702/123 |

OTHER PUBLICATIONS

Andres Kull et al., "End-to-End Testing Automation in TTCN-3 environment using Conformiq Qtronic & Elvior MessageMagic", TTCN-3 Users Conference 2009, Asia, Bangalore, India.

* cited by examiner

TEST CASE EXECUTION

BACKGROUND

System and software development are thriving in various businesses today. For instance, companies are developing new systems and software on a daily basis. In addition, many companies are developing systems and software in-house that meets specific needs of that business. Accordingly, development of the systems and software applications requires rigorous testing to ensure proper functionality. In many arrangements, this testing may include execution of one or more test cases configured to test the functionality of one or more aspects of the system or application. Conventional systems and methods of executing these test cases can be cumbersome and involve substantial user involvement in scheduling execution of the test cases, setting up computing devices to execute the test cases, and the like. These conventional systems can be inefficient, time consuming and prone to errors.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, computer-readable media, and apparatuses for executing one or more test cases associated with verifying a functionality of a computer system, software application, or the like. The test cases may be received, such as with a request to execute the test cases, by a system. The system may then prioritize the received test cases and integrate the test cases into an existing queue of test cases based on the determined priority. In some examples, a configuration or set-up for a computing device to execute the test cases may be identified and transmitted to one or more computing devices available to or scheduled to execute the test cases. Accordingly, the test cases may be dynamically allocated to available computing devices for execution.

In some arrangements, one or more reports may be generated and/or transmitted reporting the results of the execution of the test cases. The reports may be accessible via the system and/or may be transmitted to a user (such as the requesting user) via, for example, an email message.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

It is noted that various connections between elements are discussed in the following description. It is noted that these connections are general and, unless specified otherwise, may be direct or indirect, wired or wireless, and that the specification is not intended to be limiting in this respect.

Various aspects described herein relate to automatically executing one or more test cases. Test cases may be created and executed in creating software applications in order to determine whether an application, software system, or various different functionalities of the system are performing as expected. Creation of an application or software system may require execution of tens, hundreds or thousands of test cases to ensure the functionality is as expected. Accordingly, automatic execution of these test cases may improve efficiency, reduce time required to develop systems, and the like. Various aspects of test case execution will be discussed more fully below.

Figure 1:
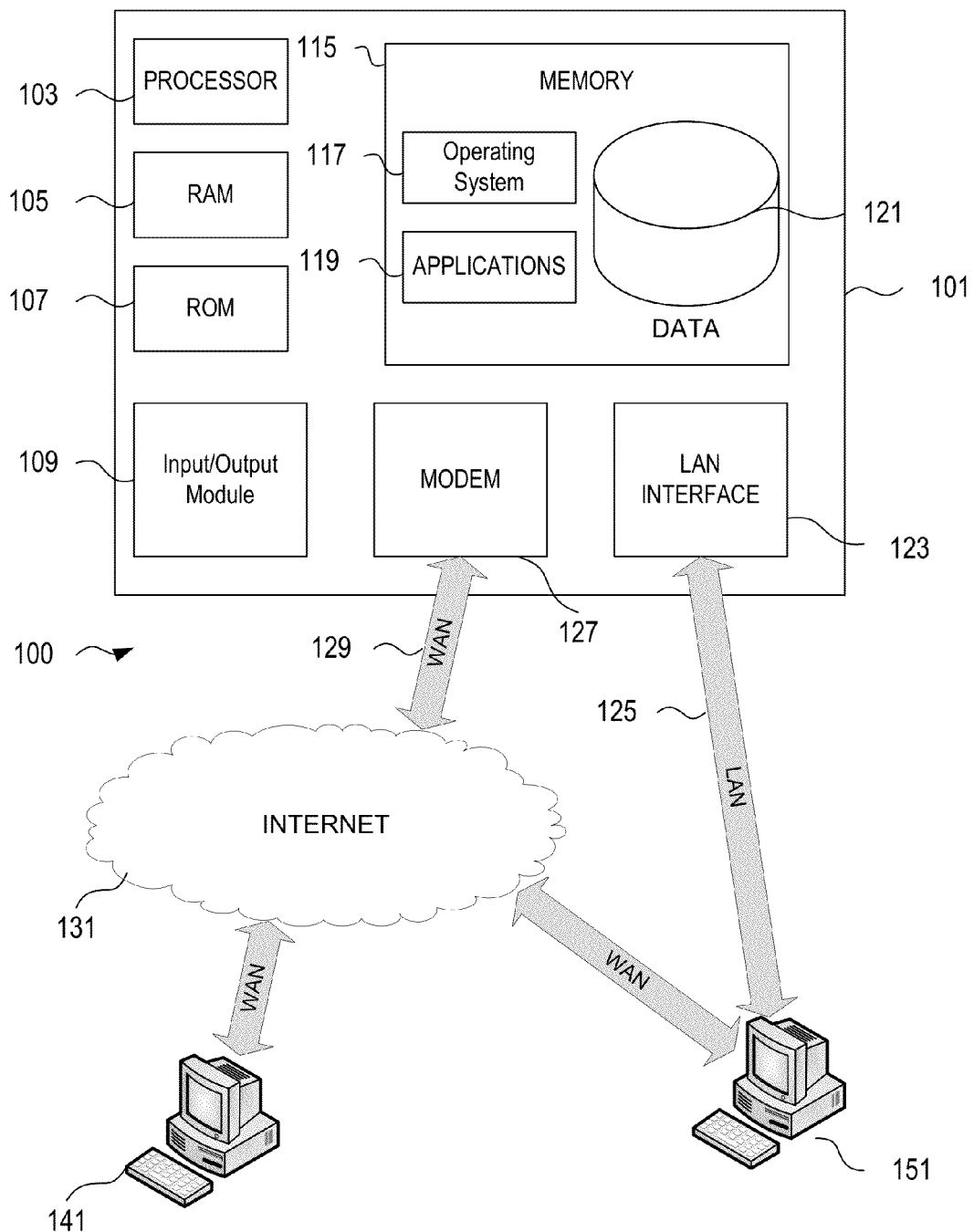
FIG. 1 illustrates an example operating environment in which various aspects of the disclosure may be implemented.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed arrangements is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. Computing devices 141 or 151 may be a mobile device (e.g., smart phone) communicating over a wireless carrier channel.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
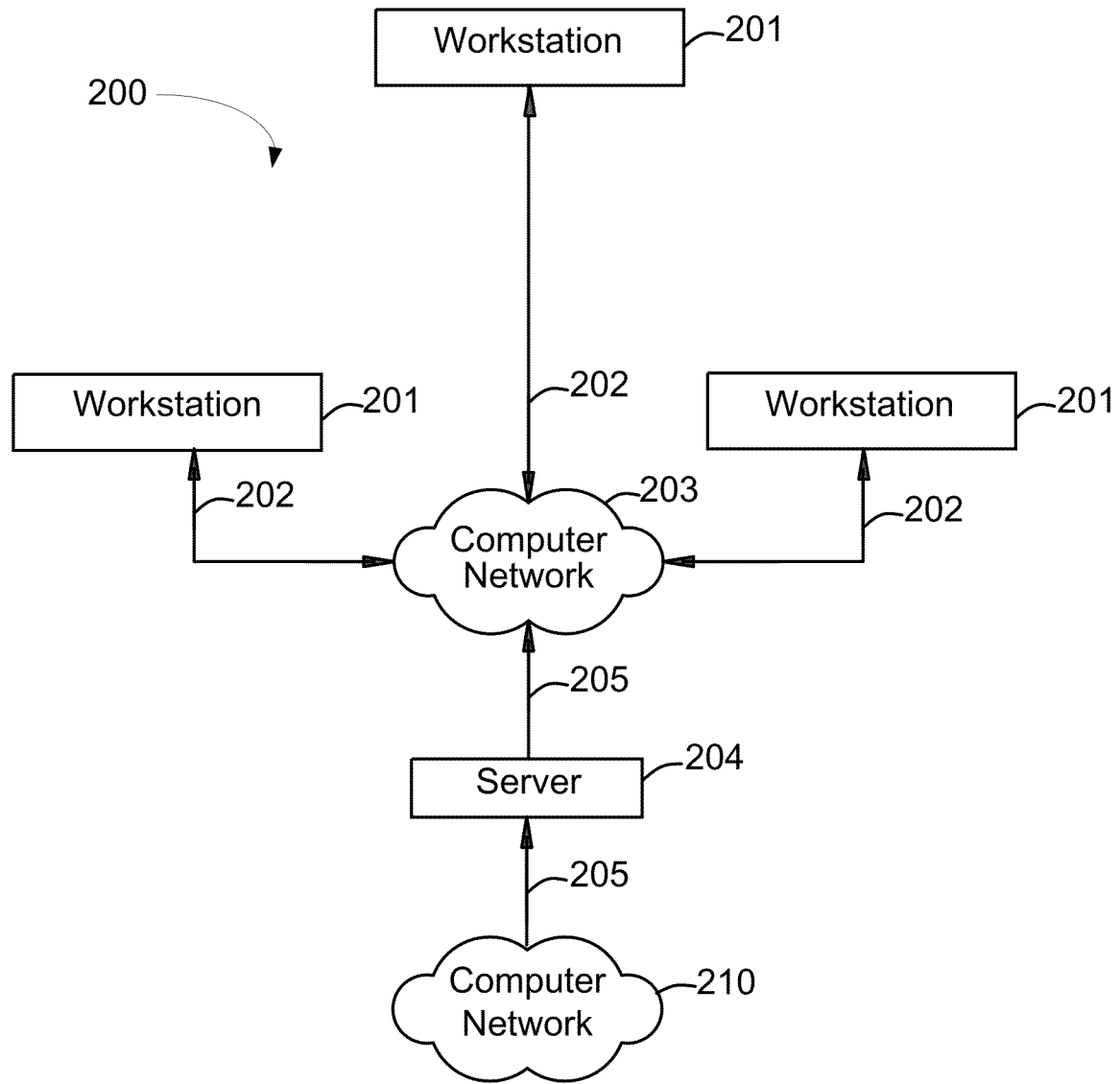
FIG. 2 is an illustrative block diagram of workstations and servers that may be used to implement the processes and functions of certain aspects of the present disclosure according to one or more aspects described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hardwired links, as well as network types developed in the future, and the like. A virtual machine may be a software implementation of a computer that executes computer programs as if it were a standalone physical machine.

Figure 3:
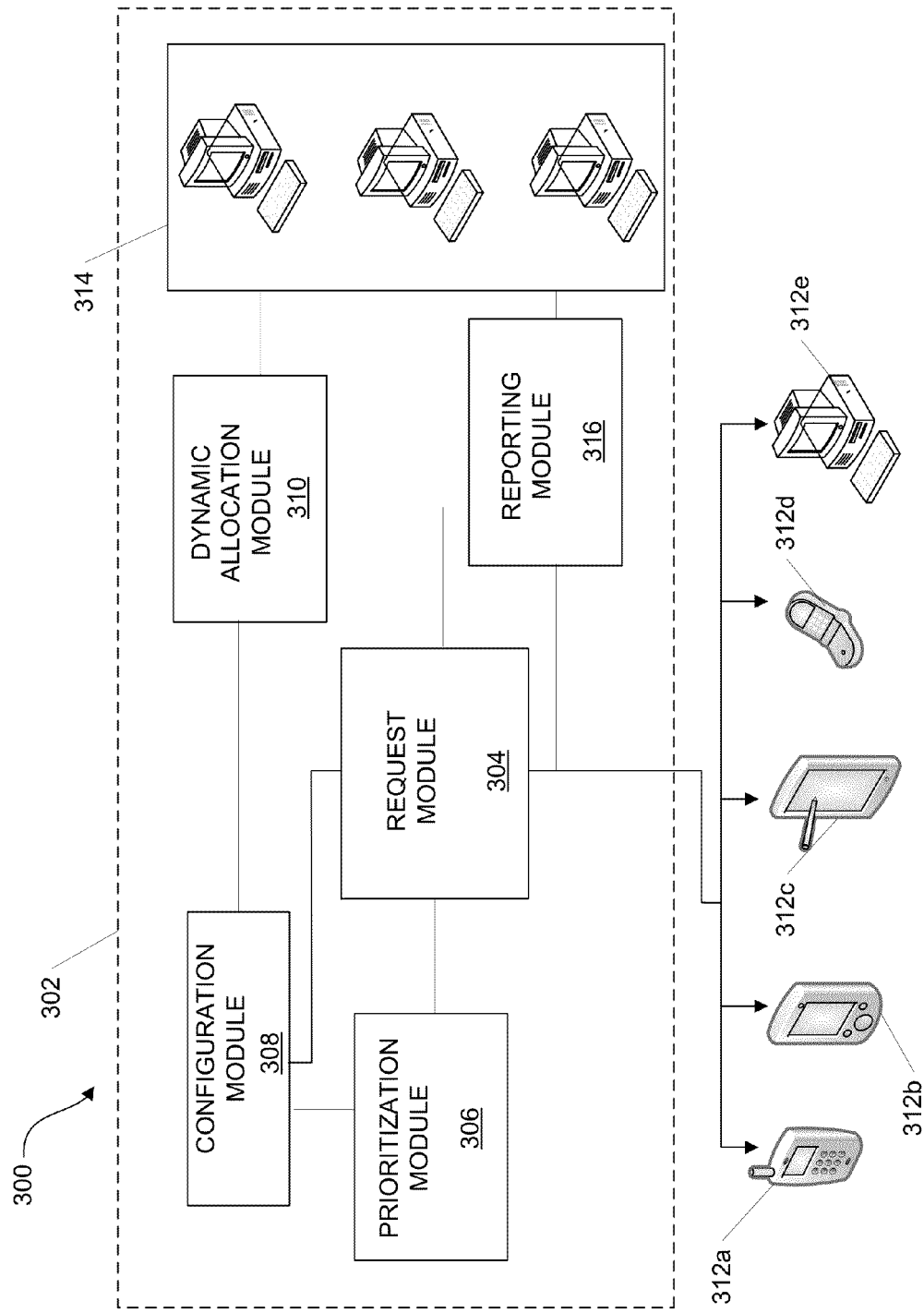
FIG. 3 illustrates an example test case execution system according to one or more aspects described herein.

FIG. 3 illustrates one example test case execution system 300 according to one or more aspects described herein. In some examples, the test case execution system 300 may be part of, internal to or associated with an entity 302. The entity 302 may be a corporation, university, government entity, and the like. In some examples, the entity 302 may be a financial institution, such as a bank. Although various aspects of the disclosure may be described in the context of a financial institution, nothing in the disclosure shall be construed as limiting the test case execution system to use within a financial institution. Rather, the system may be implemented by various other types of entities.

The test case execution system 300 may include one or more modules that may include hardware and/or software configured to perform various functions within the system. The modules described herein may be embodied in a single computing device or may be embodied in one or more computing devices connected to or in communication with each other.

For instance, the test case execution system 300 may include a request module 304. The request module 304 may receive, or be configured to receive, requests to run or execute one or more test cases. In some examples, the request may be received by the request module 304 from one or more computing devices, such as devices 312a-312e. For instance, devices such as smartphone 312a, personal digital assistant 312b, tablet computer 312c, cell phone 312d or terminal 312e may be used to initiate a request. In some arrangements, the request to execute one or more test cases may be transmitted to the system via a web or Internet-based user interface. For example, the entity may include an interface configured to receive requests to execute one or more test cases. In other examples, the request may be received via email, such as email directed to a designated email address for initiating test cases execution. In still other arrangements, the request may be initiated as a scheduled test, e.g., scheduled directly through the system 300.

The test case execution system 300 may further include a prioritization module 306. The prioritization module 306 may, in some instances, store or maintain a queue of test cases awaiting execution. As a request for execution of a test case or plurality of test cases is received by the system (such as from computing devices 312*a*-312*e*), the new case or cases may be integrated into the queue. In some examples, the request for execution of a test case or cases may include an identification of a priority of the test case (e.g., a requestor may indicate high, medium, low priority, for example). In another example, an administrator of the system may review the request for execution of the test case or cases and may identify a priority based on the business unit or group making the request, type of test case or application being tested, identified time constraints associated with execution of the test cases, and the like. The administrator may understand and/or be aware of the priority of cases already in the queue and, thus, may prioritize the new case or cases relative to the known priority of the cases already in the queue. In still other examples, the system may automatically prioritize the new case or cases upon integration into the queue. The automatic prioritization may be based on similar factors to those discussed above, such as business unit making the request, type of test case or application, and the like.

The test case execution system 300 may further include a configuration module 308. The configuration module 308 may include various configurations to be transmitted to test execution computing devices (e.g., computing devices in test execution device bank 314). The configurations may include set-up parameters for the computing device that may allow the computing device to execute the test case. In some examples, the configuration needed to execute the test case may be a standard configuration. In other cases, the configuration may be created specifically to execute the test case or cases associated with that configuration.

In some examples, the configuration module 308 may include a plurality of configurations and a desired configuration to be used to execute the test case may be identified in the request to execute the test case or cases. For instance, a request to execute one or more test cases may include an indication of a configuration or configuration parameters to be implemented by the testing devices in order to execute the test case.

The test case execution system 300 may further include a dynamic allocation module 310. The dynamic allocation module 310 may identify one or more computing devices in test execution computing device bank 314 that is available to execute a test case. The test executing computing device bank 314 may include a plurality of computing devices that may be used or are configured to be used to execute test cases. The computing devices may include appropriate hardware, software, or combination thereof, to execute the test cases. The dynamic allocation module 310 may then transmit or cause to be transmitted the appropriate configuration from the configuration module 308 to the identified available device. The dynamic allocation module 310 may then transmit or cause to be transmitted an instruction to the available machine to execute the test case.

The dynamic allocation module 310 may then continue to identify one or more available computing devices in the test execution computing device bank 314 and transmit the appropriate configurations and instructions for executing test cases. The dynamic allocation module 310 may continue this process until all test cases in the queue have been executed. Accordingly, the system is fully automated and may run continuously, or nearly continuously, 24 hours/day in order to efficiently execute all test cases in the queue. This arrangement may save considerable time and reduce potential errors because the configuration and execution of test cases is automated. Thus, limited or no user input may be needed to execute the test cases.

The test case execution system 300 may further include a reporting module 316. The reporting module 316 may receive results from the test cases executed by the test case execution computing device bank 314. For instance, the reporting module 316 may receive information that the execution of the test case or cases is complete. The reporting module 316 may also receive information related to the number of cases executed, the number of failures and/or types of failures, the time to run one or more cases, and the like. The reporting module 316 may also store information identifying test cases executed and those awaiting execution, such that any cases selected for manual execution can be selected from the group of cases not executed to that point.

The reporting module 316 may collect the information, as discussed above, and may generate one or more reports to provide the information to a user. For instance, the reporting module 316 may generate and/or transmit a report to a user, such as a user requesting execution of the test case or cases. In some examples, the report may be generated in the form of an email indicating that the test case or cases have been executed and providing one or more metrics associated with the outcome of the execution of the test case or cases. Accordingly, requesting users may be quickly notified of completion of the execution and may quickly and efficiently work to identify failures, revise test cases to address failures and/or re-execute one or more test cases.

Figure 4:
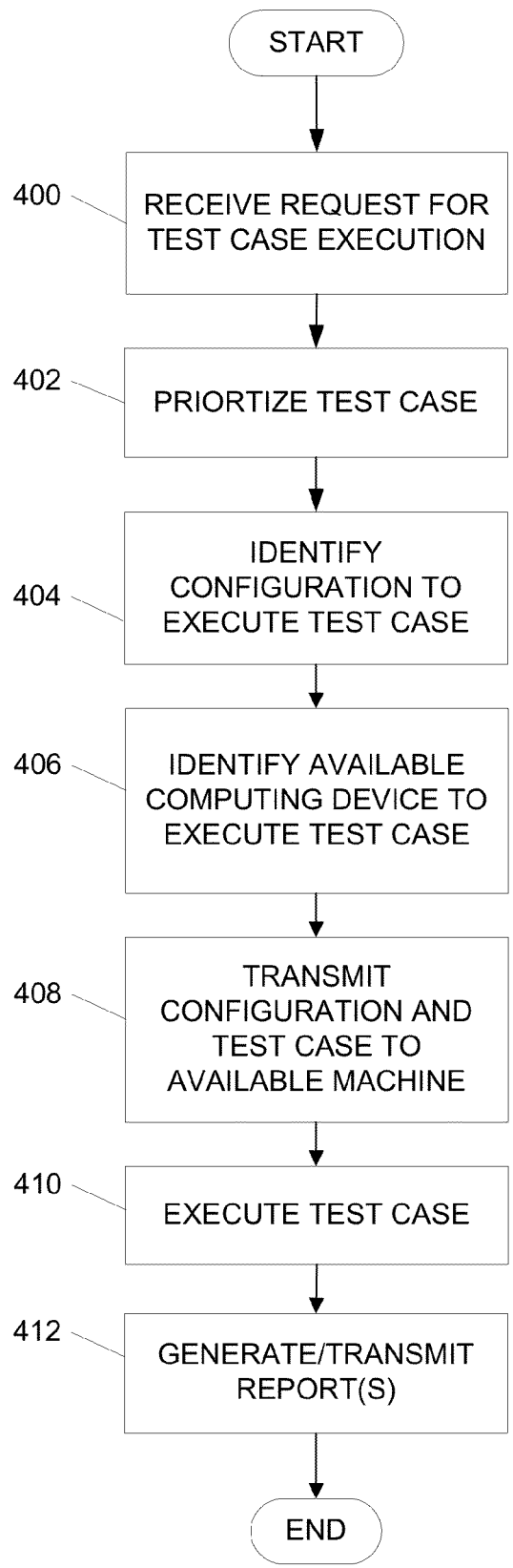
FIG. 4 is an example method executing a test case according to one or more aspects described herein.

FIG. 4 illustrates one example method of executing a test case via the test case execution system. In step 400, a request to execute a test case may be received (such as by request module 304 in system 300). The request may include one or more parameters associated with the test case, a configuration or set-up for the computing device executing the test case, a priority of the test case, an environment in which the test case should be executed, and the like. As discussed above, the request may be received via a web interface, email or may be scheduled (e.g., request may be scheduled via the system).

In step 402, the test case received for execution may be prioritized and integrated into an existing queue of test cases. In step 404, a configuration or set-up for the computing device executing the test case may be identified and in step 406 an available computing device to execute the test case may be identified. In some examples, the test case may be the next case available in the queue and, thus, the available machine would be used to execute the test case. Alternatively, the test case received may be in a lower position in the queue. Accordingly, available computing devices may be used to execute test cases higher in the queue before executing the received test case.

In step 408, the configuration or set-up associated with the test case may be transmitted to the available computing device. The test case may also be transmitted to the available machine. In step 410, the test case may be executed and in step 412 one or more reports may be generated for the executed test case.

Figure 5:
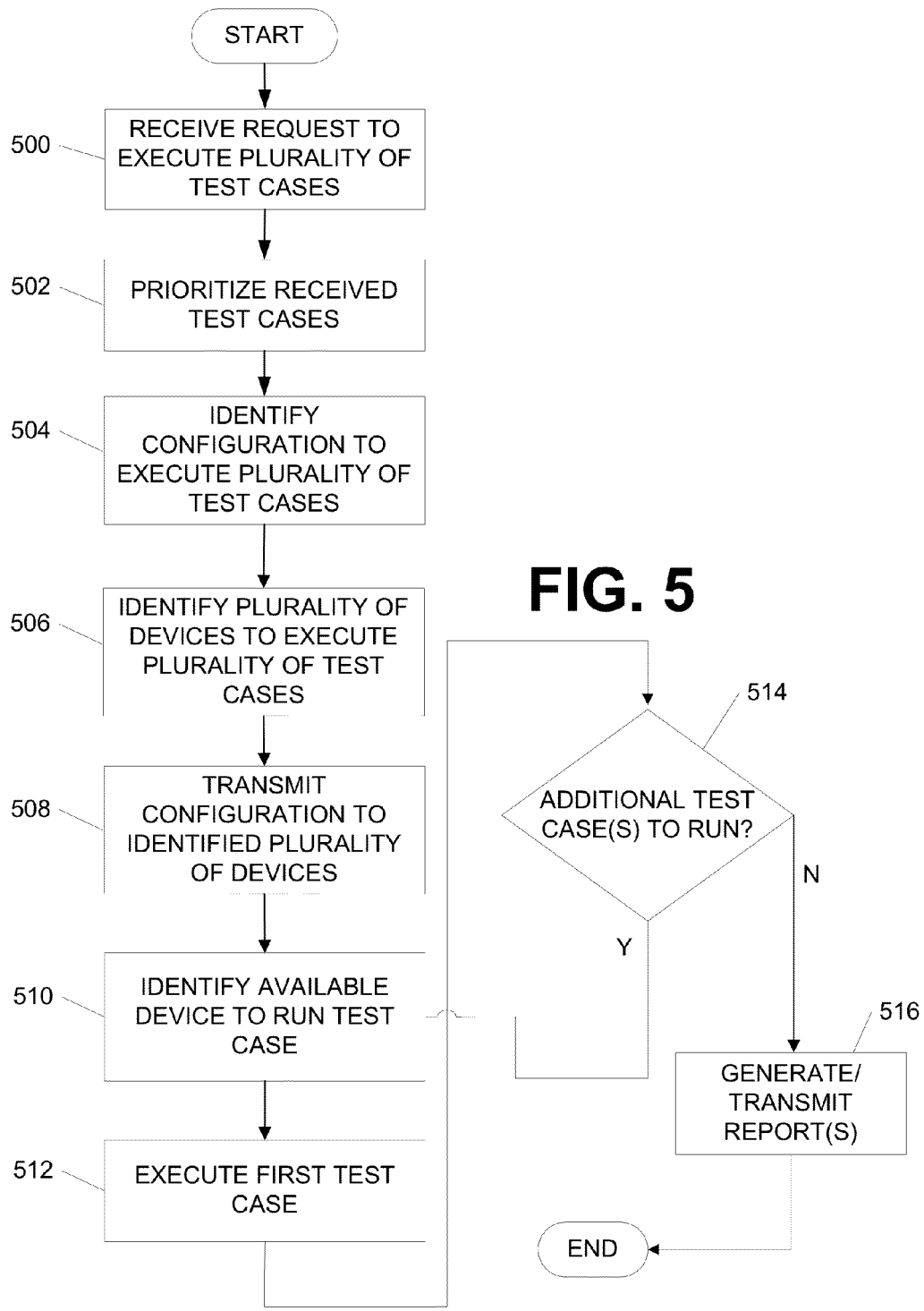
FIG. 5 illustrates another example method of executing test cases according to one or more aspects described herein.
Figure 6:
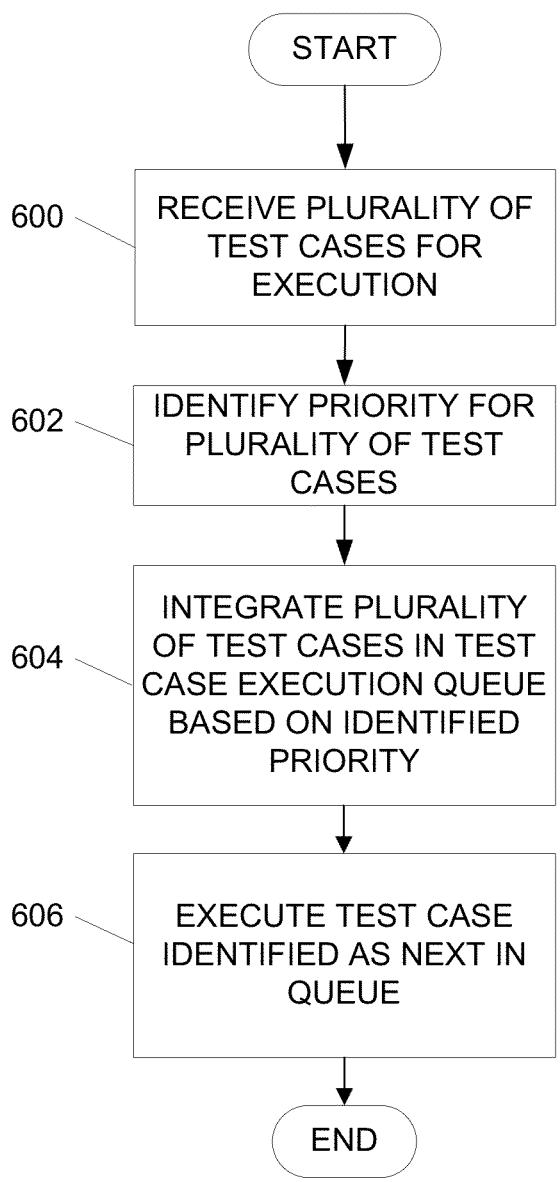
FIG. 6 is an example method of prioritizing test cases for execution according to one or more aspects described herein.

FIG. 5 illustrates another example method of executing test cases according to one or more aspects described herein. In step 500, a request to execute a plurality of test cases is received. In step 502, the received plurality of test cases is prioritized for execution. For instance, FIG. 6 illustrates an example method of prioritizing test cases according to one or more aspects described herein. In step 600, a plurality of test cases may be received for execution. In step 602, the priority for the plurality of test cases may be determined. For instance, the test cases may include an identified priority in the request for execution. In other examples, the system may automatically prioritize the plurality of test cases based on one or more factors or parameters of the test cases, such as type of test cases, business unit requesting the test cases, time constraints associated with execution of the test cases, and the like. Additionally or alternatively, a system administrator may prioritize the cases based on his or her knowledge of other test cases within the queue, an understanding of business priorities, and various other factors. In some arrangements, the plurality of test cases may be associated with a priority as a unit. For instance, all test cases in the plurality of test cases may receive the same priority ranking and thus will be tested consecutively (and/or concurrently) according to the queue. In other examples, each test cases within the plurality of test cases may receive a priority ranking and may be prioritized based on that individual test case ranking.

Once a priority of the plurality of test cases is determined, the plurality of test cases may be integrated into a queue in step 604. The queue may include one or more other test cases previously requested or scheduled. The plurality of test cases may be integrated into the queue according to the priority ranking relative to other test cases in the queue. In step 606, the test cases may be executed according to the order of the queue.

With further reference to FIG. 5, in step 504, a configuration to execute the test cases is identified. As discussed above, the configuration may be pre-stored or predetermined or may be identified and/or specified by the requestor.

In step 506, a plurality of computing devices may be identified to execute the received test cases. In some examples, the computing devices may be identified may be a portion of a larger plurality of computing devices available to execute all test cases in the queue. In step 508, the identified configuration to execute the plurality of test cases may be transmitted to the plurality of computing devices identified to execute the plurality of test cases.

In step 510, an available computing device of the plurality of identified computing devices to execute the plurality of test cases may be identified. Accordingly, in step 512, an instruction may be transmitted to the available machine to execute a first test case of the plurality of test cases. In some examples, the first test case may be determined based on a priority. Alternatively, each test case of the plurality of test cases may be identified as having a same priority and, thus, the first test case may simply be the first test case identified in the plurality of test cases.

In step 514, a determination is made as to whether there are additional test cases of the plurality of test cases to execute. If no (e.g., all test cases of the plurality of test cases has been executed), one or more reports may be generated and/or transmitted in step 516. As discussed above, the reports may include information regarding completion of the test cases, time to complete execution of the test cases, number of failures associated with execution of the test cases, and the like. The information generated may be stored (such as in reporting module 316) and may be accessible to one or more users. For instance, the users may access the information via a computing device, such as devices 312a-312e. Additionally or alternatively, an automated message, such as an email may be transmitted to the user requesting execution of the test cases. The message may include the information discussed above, as well as various other metrics associated with execution of the test cases.

If, in step 514, one or more additional test cases are to be executed, the process may return to step 510 to identify an available computing device to execute a next test case. The process may continue until all test cases of the plurality of test cases have been executed.

One or more steps described in the methods of FIGS. 4-6 may be performed automatically (e.g., without user input). Further, one or more of the steps described in FIGS. 4-6 may be performed in an order other than the order presented herein, and/or may be performed consecutively or concurrently, without departing from the invention.

In some arrangements, the steps of determining whether additional test cases are to be executed and identifying an available computing device to execute the test case may be performed while the first test case is being executed (e.g., while step 512 is being performed). Accordingly, the system may dynamically determine whether test cases remain to be executed and identify a computing device to execute one or more test cases. Accordingly, this provides improved efficiency in the system because user input may not be required to identify the next test case for execution, identify a computing device to execute the test case, perform a set-up of a computing device to execute the test case, and the like. Instead, the process may proceed automatically until all test cases in the plurality of test cases have been executed. This may also improve accuracy of executing test cases because it limits user input required to execute the test cases, thereby resulting in fewer input errors, set-up errors, and the like.

In some examples, most if not all aspects of the systems, methods, apparatuses and computer-readable media described herein may be performed automatically. For instance, the identification of a configuration of a computing device to execute the test case(s) may be performed automatically (e.g., without user input). In another example, transmitting the determined configuration to a computing device may be performed automatically. In still another example, identifying an available computing device, a next test case in a queue and/or executing the test case may be performed automatically. Various other processes may be performed automatically by the system without departing from the invention.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electro-magnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. An apparatus, comprising:
   at least one processor; and
   a memory storing computer-readable instructions that, when executed by the at least one processor, cause the apparatus to:
   receive a request to execute a plurality of test cases, the request to execute the plurality of test cases including a priority for each test case of the plurality of test cases;
   determine a set-up configuration associated with execution of the plurality of test cases;
   identify a plurality of test case execution computing devices to execute the plurality of test cases;
   transmit the determined set-up configuration to the identified plurality of test case execution computing devices;
   identify a first test case execution computing device of the plurality of test case execution computing devices that is available to execute a first test case of the plurality of test cases, the first test case being determined based on the received priority;
   execute the first test case by the first test case execution computing device;
   determine whether additional test cases are to be executed;
   responsive to determining that additional test cases are to be executed, identify a second test case execution computing device of the plurality of test case execution computing devices that is available to execute a second test case;
   execute the second test case by the second test case execution computing device;
   generate a report including identification of test cases of the plurality of test cases executed and identification of test cases of the plurality of test cases not executed; and
   determine whether the test cases of the plurality of test cases not executed should be manually executed.

2. The apparatus of claim 1, further including instructions that, when executed, cause the apparatus to:
   responsive to determining that no additional test cases are to be executed, generate a report including results of the execution of test cases executed and transmitting the report to a user via email.

3. The apparatus of claim 1, further including instructions that, when executed, cause the apparatus to:
   integrate the plurality of test cases into an existing queue of test cases awaiting execution according to the received priority.

4. The apparatus of claim 1, further including instructions that, when executed, cause the apparatus to:
   repeat the determining of whether additional test cases are to be executed until all test cases of the plurality of test cases have been executed.

5. The apparatus of claim 1, wherein the request to execute the plurality of test cases is received via at least one of: email, a web-based user interface and a schedule execution.

6. The apparatus of claim 1, wherein at least one of:
   determining the set-up configuration associated with execution of the plurality of test cases;
   identifying the plurality of test case execution computing devices to execute the plurality of test cases;
   transmitting the determined set-up configuration to the identified plurality of test case execution computing devices;
   identifying the first test case execution computing device of the plurality of test case execution computing devices that is available to execute the first test case of the plurality of test cases, the first test case being determined based on the received priority;
   executing the first test case by the first test case execution computing device;
   determining whether additional test cases are to be executed;
   responsive to determining that additional test cases are to be executed, identifying the second test case execution computing device of the plurality of test case execution computing devices that is available to execute the second test case; and
   executing the second test case by the second test case execution computing device,
   is performed automatically.

7. The apparatus of claim 1, wherein the received priority is based, at least in part, on a business group from which the test cases were received.

8. A method, comprising:
   receiving a request to execute a plurality of test cases, the request to execute the plurality of test cases including a priority for each test case of the plurality of test cases;
   determining a set-up configuration associated with execution of the plurality of test cases;
   identifying a plurality of test case execution computing devices to execute the plurality of test cases;
   transmitting the determined set-up configuration to the identified plurality of test case execution computing devices;
   identifying a first test case execution computing device of the plurality of test case execution computing devices that is available to execute a first test case of the plurality of test cases, the first test case being determined based on the received priority;
   executing the first test case by the first test case execution computing device;
   determining whether additional test cases are to be executed;
   responsive to determining that additional test cases are to be executed, identifying a second test case execution computing device of the plurality of computing devices that is available to execute a second test case;
   executing the second test case by the second test case execution computing device;
   generating a report including identification of test cases of the plurality of test cases executed and identification of test cases of the plurality of test cases not executed; and
   determining whether the test cases of the plurality of test cases not executed should be manually executed.

9. The method of claim 8, further including:
   responsive to determining that no additional test cases are to be executed, generating a report including results of the execution of test cases executed and transmitting the report to a user via email.

10. The method of claim 8, further including:
    integrating the plurality of test cases into an existing queue of test cases awaiting execution according to the received priority.

11. The method of claim 8, further including:
repeat the determining of whether additional test cases are to be executed until all test cases of the plurality of test cases have been executed.

12. The method of claim 8, wherein the plurality of test case execution computing devices are a portion of a larger plurality of test case execution computing devices available for execution of test cases.

13. The method of claim 8, wherein the request to execute the plurality of test cases is received via at least one of: email, a web-based user interface and a schedule execution.

14. The method of claim 8, wherein at least one of:
determining the set-up configuration associated with execution of the plurality of test cases;
identifying the plurality of test case execution computing devices to execute the plurality of test cases;
transmitting the determined set-up configuration to the identified plurality of test case execution computing devices;
identifying the first test case execution computing device of the plurality of test case execution computing devices that is available to execute the first test case of the plurality of test cases, the first test case being determined based on the received priority;
executing the first test case by the first test case execution computing device;
determining whether additional test cases are to be executed;
responsive to determining that additional test cases are to be executed, identifying the second test case execution computing device of the plurality of test case execution computing devices that is available to execute the second test case; and
executing the second test case by the second test case execution computing device,
is performed automatically.

15. One or more non-transitory computer-readable media having computer-executable instructions stored thereon that, when executed, cause at least one computing device to:
receive a request to execute a plurality of test cases, the request to execute the plurality of test cases including a priority for each test case of the plurality of test cases;
determine a set-up configuration associated with execution of the plurality of test cases;
identify a plurality of test case execution computing devices to execute the plurality of test cases;
transmit the determined set-up configuration to the identified plurality of test case execution computing devices;
identify a first test case execution computing device of the plurality of test case execution computing devices that is available to execute a first test case of the plurality of test cases, the first test case being determined based on the received priority;
execute the first test case by the first test case execution computing device;
determine whether additional test cases are to be executed;
responsive to determining that additional test cases are to be executed, identify a second test case execution computing device of the plurality of test case execution computing devices that is available to execute a second test case; and
execute the second test case by the second test case execution computing device;
generate a report including identification of test cases of the plurality of test cases executed and identification of test cases of the plurality of test cases not executed; and
determine whether the test cases of the plurality of test cases not executed should be manually executed.

16. The one or more non-transitory computer-readable media of claim 15, further including instructions that, when executed, cause the at least one computing device to:
responsive to determining that no additional test cases are to be executed, generate a report including results of the execution of test cases executed and transmitting the generated report to a user via email.

17. The one or more non-transitory computer-readable media of claim 15, further including instructions that, when executed, cause the at least one computing device to:
integrate the plurality of test cases into an existing queue of test cases awaiting execution according to the received priority.

18. The one or more non-transitory computer-readable media of claim 15, further including instructions that, when executed, cause the at least one computing device to:
repeat the determining of whether additional test cases are to be executed until all test cases of the plurality of test cases have been executed.

19. The one or more non-transitory computer-readable media of claim 15, wherein at least one of:
determining the set-up configuration associated with execution of the plurality of test cases;
identifying the plurality of test case execution computing devices to execute the plurality of test cases;
transmitting the determined set-up configuration to the identified plurality of test case execution computing devices;
identifying the first test case execution computing device of the plurality of test case execution computing devices that is available to execute the first test case of the plurality of test cases, the first test case being determined based on the received priority;
executing the first test case by the first test case execution computing device;
determining whether additional test cases are to be executed;
responsive to determining that additional test cases are to be executed, identifying the second test case execution computing device of the plurality of test case execution computing devices that is available to execute the second test case; and
executing the second test case by the second test case execution computing device,
is performed automatically.

\* \* \* \* \*